(12) United States Patent
Kerner et al.

(10) Patent No.: US 8,270,120 B2
(45) Date of Patent: Sep. 18, 2012

(54) FLEX CABLE ASSEMBLY DAMPER

(75) Inventors: Jeffrey Kerner, San Jose, CA (US);
Kirk B. Price, San Jose, CA (US);
Robert C. Reinhart, San Jose, CA (US);
Edgar D. Rothenberg, San Jose, CA (US); Jr-Yi Shen, Sunnyvale, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 1046 days.

(21) Appl. No.: 11/998,511

(22) Filed: Nov. 30, 2007

(65) Prior Publication Data
US 2009/0141404 A1 Jun. 4, 2009

(51) Int. Cl.
*G11B 5/48* (2006.01)

(52) U.S. Cl. .................. 360/264.2; 360/245.9

(58) Field of Classification Search ............ 360/264.2, 360/266.3, 245.9, 245.8
See application file for complete search history.

(56) References Cited

U.S. PATENT DOCUMENTS

| | | | | |
|---|---|---|---|---|
| 5,606,477 | A * | 2/1997 | Erpelding et al. | 360/244.3 |
| 5,818,667 | A * | 10/1998 | Larson | 360/264.2 |
| 5,907,452 | A | 5/1999 | Kan | |
| 5,940,252 | A * | 8/1999 | Patterson | 360/264.2 |
| 5,955,176 | A * | 9/1999 | Erpelding et al. | 428/209 |
| 6,353,515 | B1 | 3/2002 | Heim | |
| 6,563,676 | B1 | 5/2003 | Chew et al. | |
| 6,636,383 | B1 | 10/2003 | Chew | |
| 6,893,718 | B2 * | 5/2005 | Melancon et al. | 428/355 AC |
| 6,937,442 | B2 | 8/2005 | Zhao et al. | |
| 7,064,931 | B2 | 6/2006 | Hutchinson | |
| 7,116,522 | B2 * | 10/2006 | Poorman | 360/241 |
| 7,495,866 | B2 * | 2/2009 | Izumi et al. | 360/264.2 |
| 7,649,718 | B1 * | 1/2010 | Edwards | 360/264.2 |
| 7,903,377 | B2 * | 3/2011 | Huang et al. | 360/264.2 |
| 2002/0167757 | A1 * | 11/2002 | McCutcheon et al. | 360/99.08 |
| 2003/0137776 | A1 | 7/2003 | Zhoa et al. | |
| 2003/0235012 | A1 * | 12/2003 | Nishizawa | 360/264.2 |
| 2004/0264058 | A1 | 12/2004 | Huynh | |
| 2006/0276058 | A1 | 12/2006 | Freeman et al. | |
| 2007/0153415 | A1 * | 7/2007 | Chang et al. | 360/97.01 |
| 2007/0153426 | A1 * | 7/2007 | Izumi et al. | 360/264.2 |
| 2009/0141404 | A1 * | 6/2009 | Kerner et al. | 360/245.8 |

OTHER PUBLICATIONS

Brake, et al., "Optimizing Vibration Isolation of Flex Circuits in Hard Disk Drives", *Journal of Vibration and Acoustics*, Apr. 2005, vol. 127, Issue 2, 165-172.

* cited by examiner

*Primary Examiner* — Brian Miller

(57) ABSTRACT

A flex cable assembly for a head stack assembly of a hard disk drive comprises a flex cable for conducting data signals from the head stack assembly to a connector. The flex cable comprises a dynamic loop section between a termination for the head stack assembly and the connector. A constrained layer damper is attached adjacently to an area of the flex cable that is configured to receive the coupler. The constrained layer damper extends into the dynamic loop section of the flex cable.

22 Claims, 7 Drawing Sheets

FLEX CABLE ASSEMBLY DAMPER

TECHNICAL FIELD

This invention relates generally to the field of direct access storage devices and in particular to controlling the vibration of a flex cable dynamic loop.

BACKGROUND

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

Vibration can limit the performance of an HDD, and if uncontrolled can render an HDD inoperable. Various methods and systems for controlling vibration are well known in the art. These can range from vibration absorbent materials to extraneous systems such as shock absorbers and active vibration controls systems with feedback loops. When considering a method for controlling vibration, size, cost, and compatibility with the operating environment need to be considered. These considerations become particularly challenging in HDD technology.

Mitigating vibration in an HDD will allow an HDD to write more data tracks on a disk surface. Controlling vibration in an HDD will also allow the subassemblies in an HDD to settle on these data tracks more quickly and allow faster writing and retrieval of data.

SUMMARY OF THE INVENTION

Various embodiments of the present invention are described herein. A flex cable assembly for a head stack assembly of a hard disk drive comprises a flex cable for conducting data signals from the head stack assembly to a connector. The flex cable comprises a dynamic loop section between a termination for the head stack assembly and the connector. A constrained layer damper is attached adjacently to an area of the flex cable that is configured to receive the coupler. The constrained layer damper extends into the dynamic loop section of the flex cable.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of embodiments of the present invention, numerous specific details are set forth in order to provide a thorough understanding of the present invention. However, it will be recognized by one of ordinary skill in the art that embodiments of the present invention may be practiced without these specific details. In other instances, well known methods, procedures, and components have not been described in detail as not to unnecessarily obscure aspects of the present invention.

The discussion will begin with a brief overview of a hard disk drive (HDD) which comprises a flex cable assembly whereby desirable performance of an HDD can be enabled. The discussion will then focus on embodiments of the present invention by which a damper component when coupled with a flex cable and consequently to a head stack assembly (HSA) can present desirable dynamic performance of the HSA and the HDD wherein the HSA is assembled. The implementation of embodiments of the present invention will then be discussed.

Overview

Figure 1:
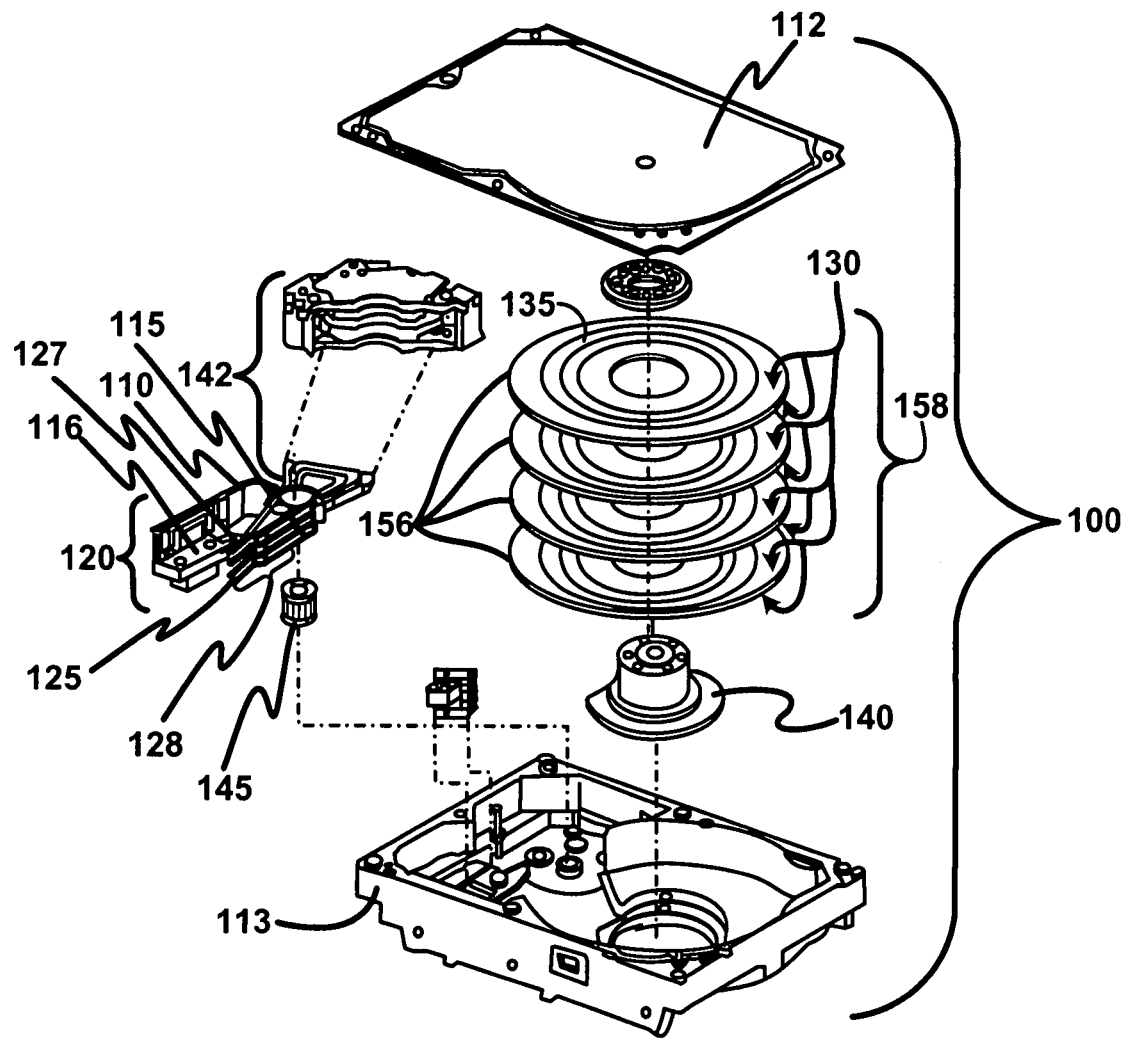
FIG. 1 is an isometric blow-apart of an HDD in accordance with one embodiment of the present invention.

With reference to FIG. 1, an isometric blow-apart of HDD 100 is presented in accordance with an embodiment of the present invention. Base casting 113 provides coupling points for components and subassemblies such as disk stack 158, voice coil motor (VCM) 142, and HSA 120. Disk stack 158 is coupled with base casting 113 by means of motor-hub assembly 140. Motor-hub assembly 140 will have at least one disk 156 coupled with it such that disk 156 can rotate about an axis common to motor-hub assembly 140 and the center of disk 156. Disk 156 has at least one disk surface 130 upon which reside data track 135. HSA 120, referred to as an actuator when coupled with pivot bearing 145, comprises suspension 127, which suspends hard disk drive slider 125 next to disk surface 130, and connector 116, which conveys data between A/E module 115 and a host system wherein HDD 100 resides. Suspension 127 and hard disk drive slider 125 comprise head gimbal assembly (HGA) 128. Flex cable 110, which is part of HSA 120, conveys data between connector 116 and HSA 120.

HSA 120 is coupled pivotally with base casting 113 by means of pivot bearing 145, such that VCM 142 can move HGA 128 with slider 125 arcuately across disk surface 130. Upon assembly of HSA 120, disk stack 158, VCM 142, and other components with base casting 113, cover 112 is coupled with base casting 113 to enclose these components and subassemblies into HDD 100.

Figure 2:
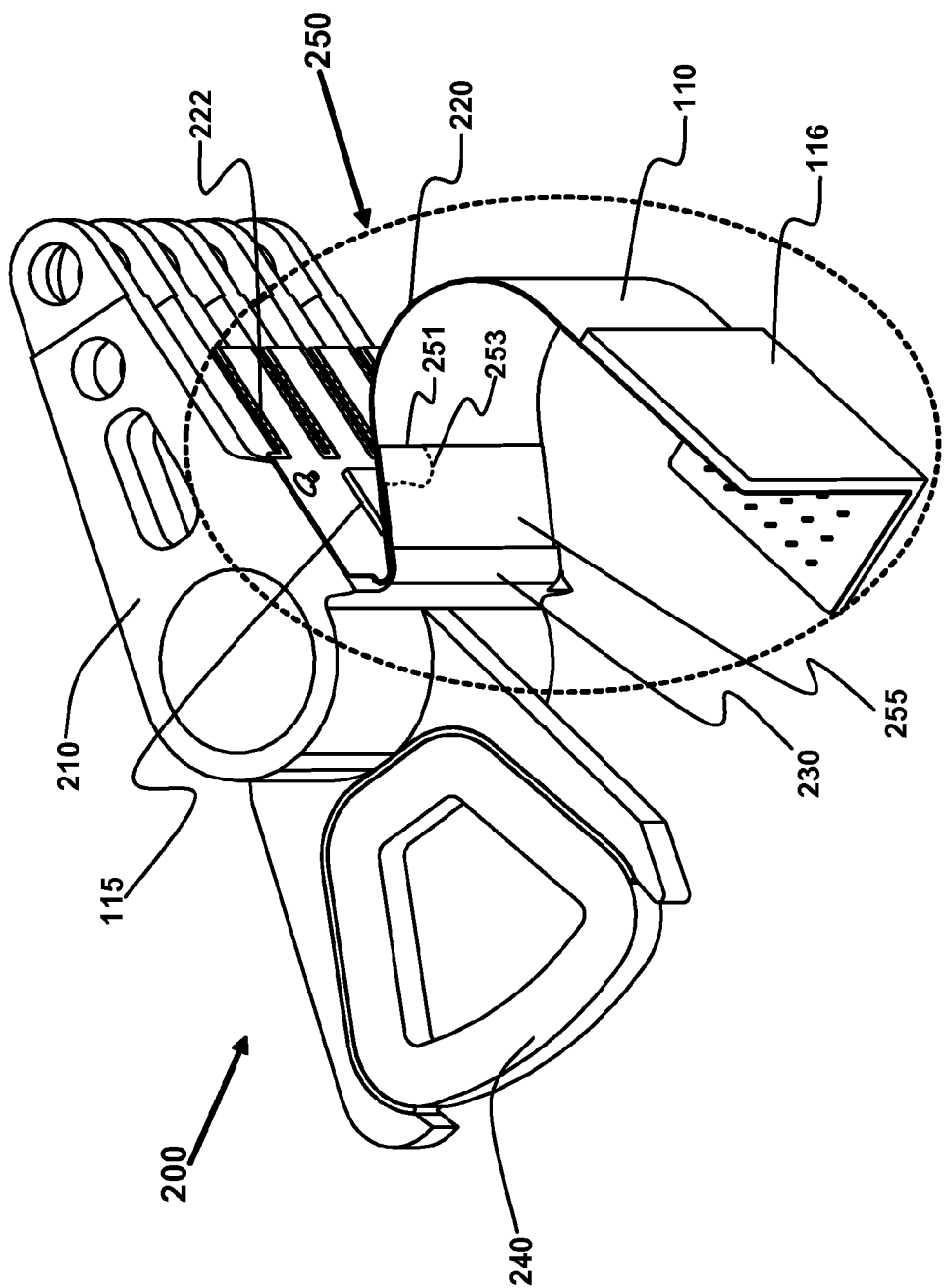
FIG. 2 is an isometric of a comb assembly in accordance with one embodiment of the present invention.
Figure 3:
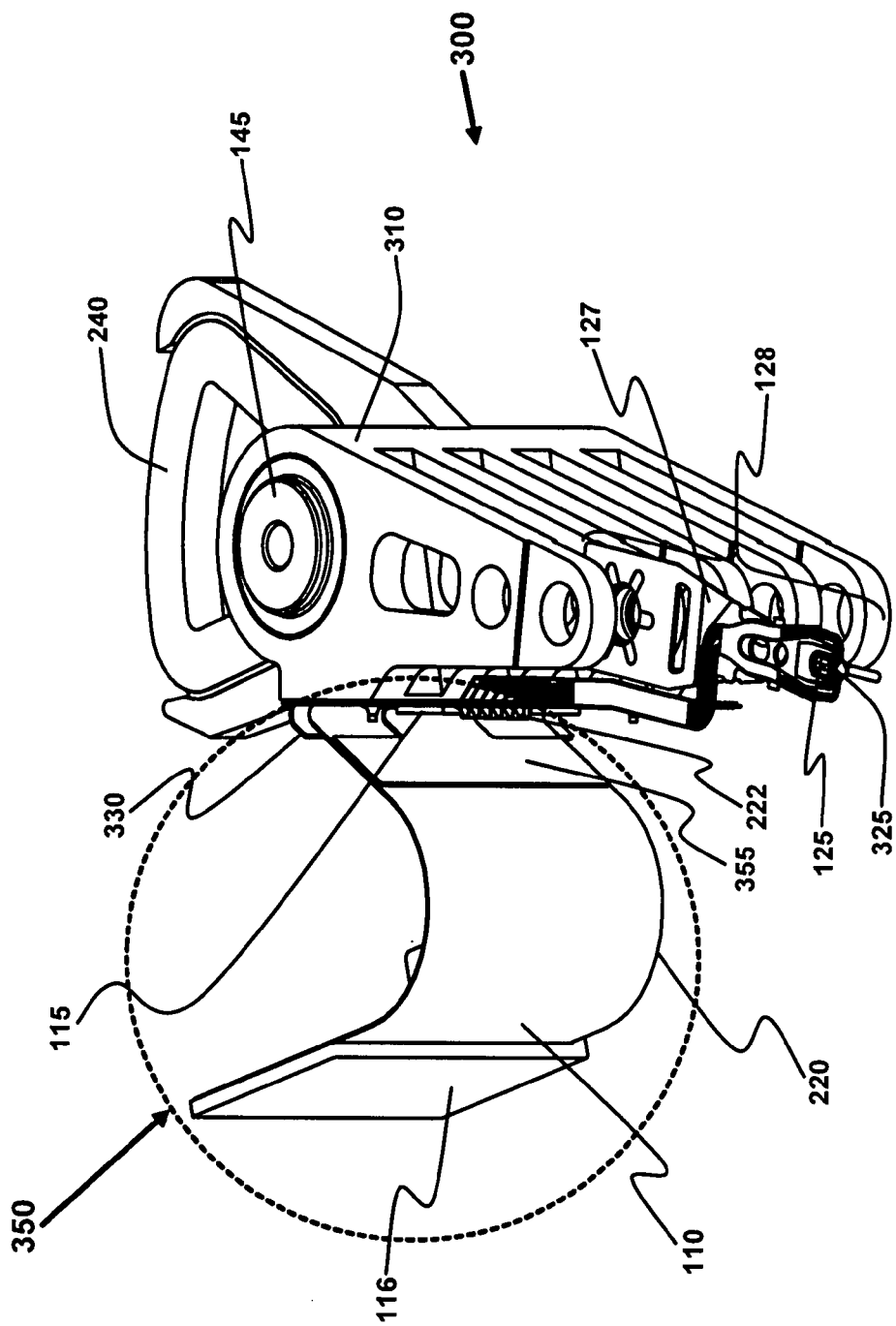
FIG. 3 is an isometric of an actuator in accordance with one embodiment of the present invention.

With reference to FIG. 2 and FIG. 3, the hierarchy of subassemblies and assemblies, is defined as follows: Flex cable assembly (250, 350) is a subassembly which can be coupled with comb 210. In general, flex cable assembly (250, 350) has flex cable 110 for conducting data signals from HSA 120 to connector 116. Flex cable 110 is a component to which other components can be added, such as A/E module 115, connector 116, and coupler 230, wherein assembled comprises flex cable assembly (250, 350). Comb assembly 200 is a subassembly which is operable to receiving at least one HGA 128. In general, comb assembly 200 comprises, comb 210, voice coil 240, and flex cable assembly (250, 350). Coupling at least one HGA 128 with comb assembly 200 comprises HSA 120. Coupling pivot bearing 145 with HSA 120 comprises actuator 300.

Components can be interchanged or shared between subassemblies while maintaining the spirit of the definitions of the aforementioned assemblies and subassemblies. In accordance with an embodiment of the present invention, and as presented in FIG. 2, coupler 230 is an integral part of comb 210. In accordance with an embodiment of the present invention, and as presented in FIG. 3, coupler 330 is a component of flex cable assembly 350.

In accordance with embodiments of the present invention, a damper is coupled with flex cable 110 such that the damper spans an area of flex cable 110 where, upon operation in HDD 100, there is relative motion between HSA 120 and dynamic loop section 220. A damper is designed to primarily reduce the gain of the frequency of vibration. There may be a small change in frequency, which is typically due to changing the mass and/or the stiffness of the spring/mass system being damped. Dampers are most effective when they move in the direction of the vibration that is being damped. In general, a damper reduces the gain of a vibration and attenuates the frequency of vibration by absorbing the energy of vibration.

Inherent in passive dampers, such as shock absorbers, leaf springs, and constrained layer dampers, particular to embodiments of the present invention, the energy of vibration is transferred into small amounts of heat. In brief, a constrained layer damper (CLD) dampens vibration by cyclically deforming a damping material that is covered on at least one surface by a material stiffer than the damping material. The stiffer material constrains the damping material as it is cyclically deformed by the vibration and imparts strain into the damping material. The damping material resists deformation and converts the strain energy into small amounts of heat.

Physical Description

With reference to FIG. 2, an isometric of comb assembly 200 is presented in accordance with an embodiment of the present invention. Comb assembly 200, when coupled with HSA 120 and pivot bearing 145, is operable to arcuately moving magnetic transducer 325 (FIG. 3) across data tracks 135 in HDD 100. Comb assembly 200 comprises a flex cable assembly 250, wherein flex cable assembly 250 has flex cable 110 for conducting data signals from HSA 120 to connector 116, and a constrained layer damper (CLD) 255. Flex cable 110 comprises a dynamic loop section 220 between termination 222 for HSA 120 and connector 116. CLD 255 is attached to dynamic loop section 220 of flex cable 110 and attached adjacently to an area of flex cable 110 configured for receiving coupler 230.

In accordance with an embodiment of the present invention, CLD 255 comprises constraining layer 253 adhered to a first surface of a viscoelastic damping layer 251. Flex cable 110 is adhered to a second surface of viscoelastic damping layer 251. The surfaces of the constraining layer 253 and flex cable 110 which are adhered to viscoelastic damping layer are parallel to each other.

In accordance with an embodiment of the present invention, CLD 255 comprises at least one constraining layer 253. The material for constraining layer 253 of CLD 255 is chosen from a group of plastics and metals that are known for their compatibility in the environment of HDD 100, for their manufacturability, and for their specific stiffness. Examples of metals in this group are stainless steel, aluminum, and high strength copper alloys such as Cu—Ni—Si—Mg, Be—Cu—Ni, and Cu—Ti. Examples of plastics in this group are: polyimide and polyester, commonly available from DuPont Corporation as KAPTON and MYLAR; and UPILEX, commonly available from Ube Industries.

In accordance with an embodiment of the present invention, CLD 255 comprises viscoelastic damping layer 251. Viscoelastic damping layer 251 is chosen from a group of materials that are characterized by a property known as lossiness. Lossiness is the characteristic of a material to attenuate oscillations or vibrations. Lossiness is a material's resistance to cyclic motion. As with constraining layer 253, compatibility in the environment of HDD 100 and manufacturability are considered when choosing a suitable viscoelastic damping material. Examples of materials that have desirable lossiness, compatibility with the HDD environment, and manufacturability are 3M Corporation's products ISD-110, ISD-120, and ISD-142; and Nitto Denko Corporation's LA-50/100. A characteristic of the above examples of viscoelastic damping materials is their ability to act as a pressure sensitive adhesive.

In the spirit of embodiments of the present invention, other configurations of CLD 255 are possible, such as multiple constraining layers separated by one or more viscoelastic damping layers. Such a multiple layered CLD can be coupled with flex cable 110 by a viscoelastic damping layer, which is a pressure sensitive adhesive. Such a multiple layered CLD can also be coupled with flex cable 110 by an adhesive.

In accordance with embodiments of the present invention, CLD 255 spans an area of flex cable 110 where, upon operation in HDD 100, there is relative motion between HSA 120 and dynamic loop section 220. CLD 255 has an appropriate shape that bridges from an area of flex cable 110 where coupler 230 will attach flex cable 110 with HSA 120, and bridges to dynamic loop section 220, which will move and flex during arcuate movement of HSA 120. Examples of an appropriate shape for CLD 255 are T-shape, rectangular, square, oblong, I-shape, and the like. A rectangular shape is presented in FIG. 2.

Depending upon the design of HDD 100, when assembled into HDD 100, dynamic loop section 220 is directed either towards VCM 142, as presented in FIG. 1, or towards termination 222, as presented in FIG. 2.

In accordance with an embodiment of the present invention, coupler 230 for attaching flex cable 110 to HSA 120, comprises a curved device, which directs dynamic loop section 220 toward termination 222 of HSA 120. A coupler for attaching a flex cable assembly to an HSA is not limited to having a curved surface which directs dynamic loop section 220 toward termination 222 of HSA 120. As previously presented in FIG. 1, coupler 230 may have a surface that directs dynamic loop section 220 towards VCM 142.

In accordance with an embodiment of the present invention, and as presented in FIG. 2, coupler 230 by which flex cable assembly 250 can be coupled with HSA 120, is an integral part of comb 210. In accordance with an embodiment of the present invention, coupler 230 is coupled with comb 210 as a separate component of comb assembly 200.

With reference to FIG. 3 an isometric of actuator 300 is presented in accordance with one embodiment of the present invention. Many of the elements of FIG. 3 are also presented in FIG. 1. For the sake of clarity, they are presented in more detail in FIG. 3. In general, actuator 300 comprises HSA 120, which comprises comb assembly 200, which comprises flex cable assembly 350. In accordance with an embodiment of the present invention, flex cable assembly 350 further comprises coupler 330 by which flex cable assembly 350 can be coupled with HSA 120.

In accordance with an embodiment of the present invention, CLD 355 is coupled with a concave surface of dynamic loop section 220 of flex cable 110. In accordance with another embodiment of the present invention CLD 355 is coupled with a convex surface of dynamic loop section 220, as presented in FIG. 2. The location of CLD 355 on the concave and convex sides of dynamic loop section 220 is determined by the HDD designer. In accordance with an embodiment of the present invention, and as presented in FIG. 3, CLD 355 is T-shaped.

Actuator 300 without pivot bearing 145 comprises HSA 120. HSA 120 comprises at least one HGA 128 coupled with comb 210. For the sake of brevity and clarity, one HGA 128 is presented in FIG. 3. It is obvious that a plurality of HGAs can be added to comb 210 without detracting from the embodiment of the present invention. HGA 128 comprises suspension 127 and slider 125, wherein magnetic transducer 325 is coupled. Magnetic transducer 325 reads and writes data tracks 135 onto surface 130 of disk 156. Pivot bearing 145 is coupled with HSA 120 and to base casting 113 thus allowing HSA 120 to move magnetic transducer 325 arcuately across data tracks 135.

Operation

One of ordinary skill in the art can appreciate that as HSA 120 is actuated by VCM 142, HSA 120 is excited to vibrate with varying modes of vibration. These modes of vibration are in part the result of interactions of: torque generated by VCM 142; the overall stiffness and localized stiffness of HSA 120; the overall mass and localized mass of HSA 120; and the speed and frequency at which torque is applied and redirected.

When referring to localized mass and localized stiffness, HSA 120 can be viewed as a series of masses comprising slider 125, suspension 127, comb (210, 310), flex cable 110, and voice coil 240. There exist several other localized masses that for the sake of brevity and clarity are not presented here. The portions of HSA 120 that connect the localized masses have intrinsic stiffness or springiness. It is well known in the arts of physics and mechanical engineering that a series of springs and masses when interconnected will have a variety of modes and frequencies of vibration, dependent upon the magnitudes of masses, spring constants, and excitation forces.

There are several sources for vibration energy that act on actuator 300. Of particular interest to the performance of an HDD and to embodiments of the present invention are vibration of flex cable 110, which impart motion and vibration into actuator 300. Dynamic loop section 220 of flex cable 110 is required for proper arcuate movement of actuator 300. One of ordinary skill in the art can appreciate that as actuator 300 is actuated by VCM 142, dynamic loop section 220 can vibrate, transferring vibration energy into HSA 120, and inhibit magnetic transducer 325 to settle onto data tracks 135.

Figure 4A:
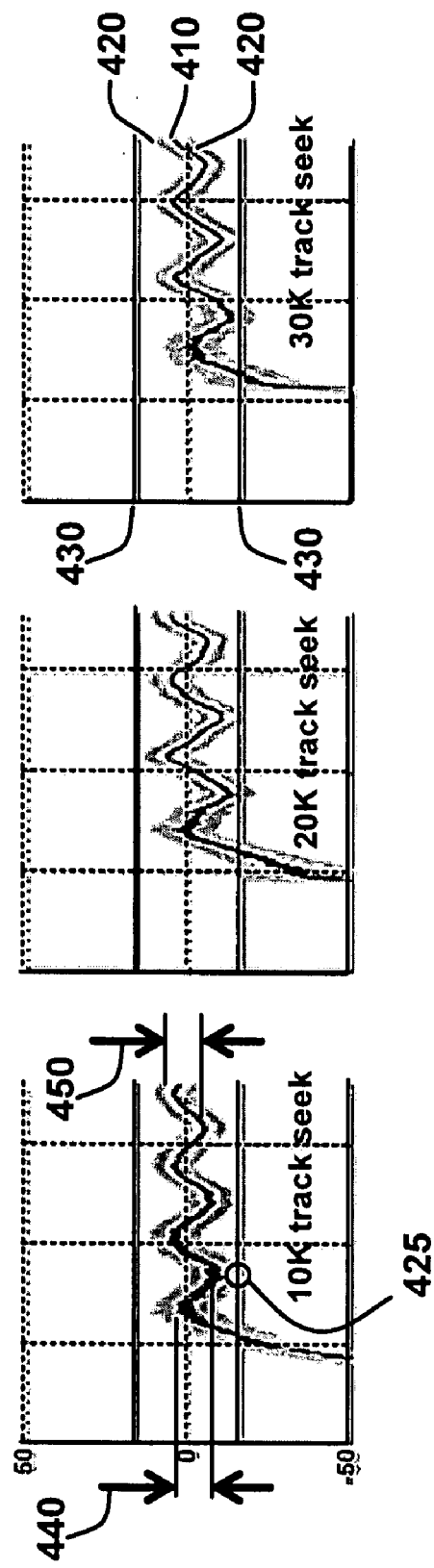
FIG. 4a is a precision error signal (PES) plot in accordance with one embodiment of the present invention.
Figure 4B:
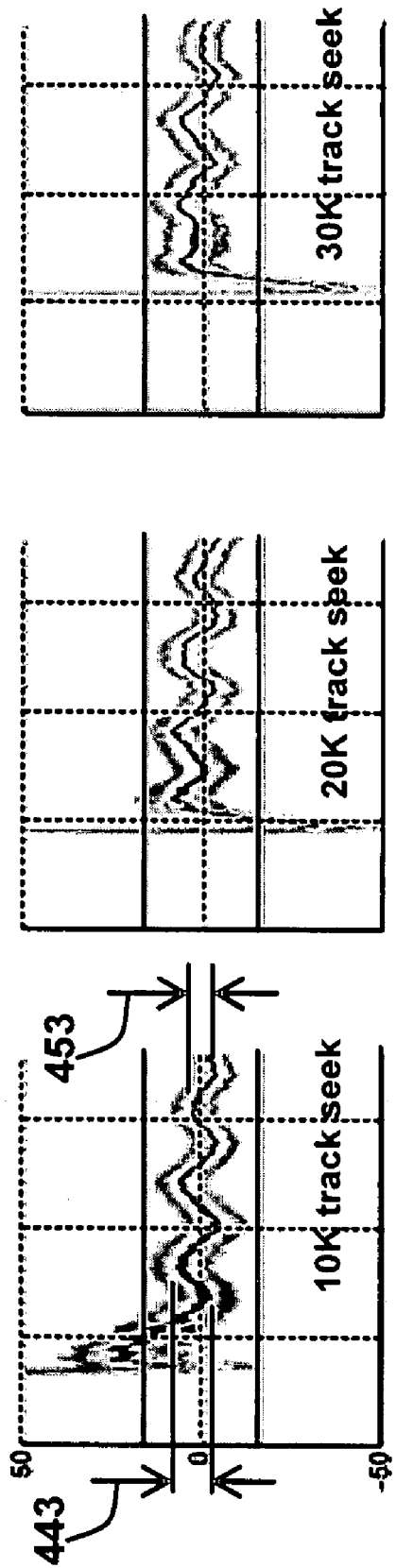
FIG. 4b is a PES plot in accordance with one embodiment of the present invention.
Figure 4C:
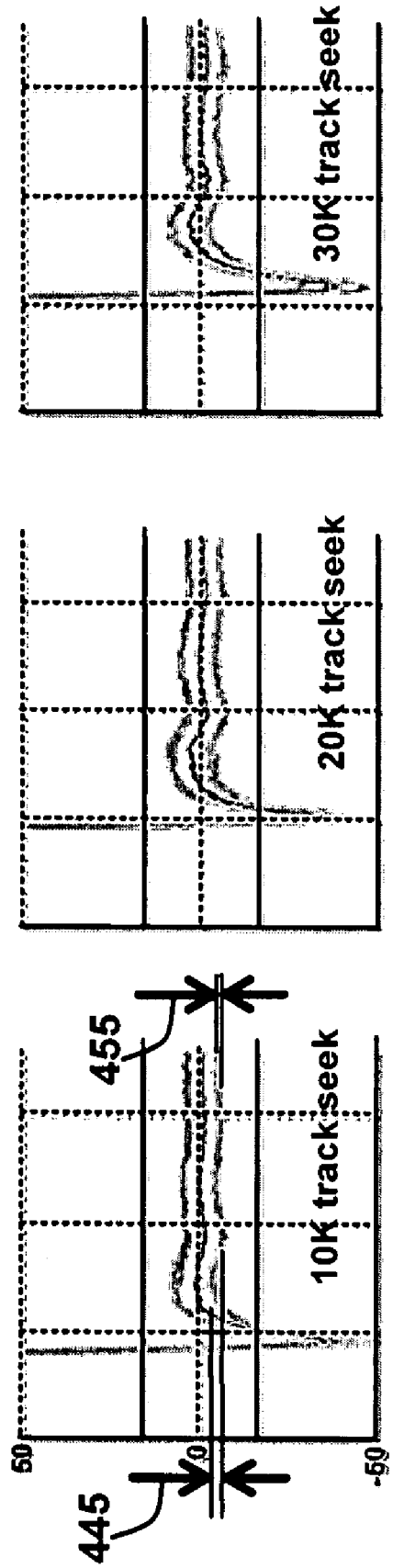
FIG. 4c is a PES plot in accordance with one embodiment of the present invention.

With reference to FIG. 4a, FIG. 4b, and FIG. 4c, precision error signal (PES) plots are presented in accordance with embodiments of the present invention. PES plots are a well known analysis tool in the art for studying random transient vibration (RTV) and its effect on track following. FIG. 4a, FIG. 4b, and FIG. 4c present similar RTV information for three actuator assemblies with three different flex cable damping conditions at three sequentially increasing excitation force conditions of 10K, 20K, and 30K track seeks. Each PES plot series in FIG. 4a, FIG. 4b, and FIG. 4c has the same elements presenting different results for the three different flex cable damping conditions undergoing the three excitation force conditions. Each PES plot records approximately three cycles of magnetic transducer 325 vibrating and moving off from a reference track similar to data track 135.

Each plot has a mean RTV 410 and a plus/minus 3 sigma (±3σ) 420, or standard deviation, of each mean RTV 410. Each plot also has a write inhibit limit 430, which when exceeded causes HDD 100 to avoid writing data to disk surface 130. Write inhibit limit 430 is exceeded when ±3σ 420, or mean RTV 410, crosses over write inhibit limit 430, such as that which occurs at crossover point 425. For the sake of brevity and clarity only one crossover point 425 is presented. Upon inspection of FIG. 4a and FIG. 4b, it is obvious that multiple crossover points 425 can occur.

FIG. 4a presents the PES plot series of an actuator not having the benefits of embodiments of the present invention. Without the benefits of CLD (255, 355) there are several crossover points 425 under all excitation force conditions. Without the benefits of CLD (255, 355) there is little noticeable attenuation in the three recorded vibration cycles. The amplitude of the first recorded vibration amplitude 440 is not noticeable different from the last recorded vibration amplitude 450.

FIG. 4b presents the PES plot series of an actuator having the benefits of embodiments of the present invention. FIG. 4b coincides with CLD 255 presented in FIG. 2. In accordance with an embodiment of the present invention, CLD 255 is a rectangular shape and is coupled with a convex surface of dynamic loop section 220. There are fewer crossover points 425 under all excitation force conditions as compared to FIG. 4a. Crossover points 425 in PES plot series are less extensive, i.e. the crossover points 425 that do occur, touch write inhibit limit 430 rather than extend beyond write inhibit limit 430. With the benefits of CLD 255 there is noticeable attenuation in the three recorded vibration cycles. The amplitude of the last recorded vibration amplitude 453 is noticeably less than the first recorded vibration amplitude 443.

FIG. 4c presents the PES plot series of an actuator having the benefits of embodiments of the present invention. FIG. 4c coincides with CLD 355 presented in FIG. 3. In accordance with an embodiment of the present invention, CLD 355 is a T-shape and is coupled with a concave surface of dynamic loop section 220. There are no crossover points 425 under all excitation force conditions. With the benefits of CLD 355 the attenuation in the three recorded vibration cycles exhibits what is known in the art as critical damping, i.e. the amplitude of the first recorded vibration amplitude 445 is considerably less than the non-damped first recorded vibration amplitude 440 of FIG. 4a, and the last recorded vibration amplitude 455 is almost non-existent after three vibration cycles.

Figure 5:
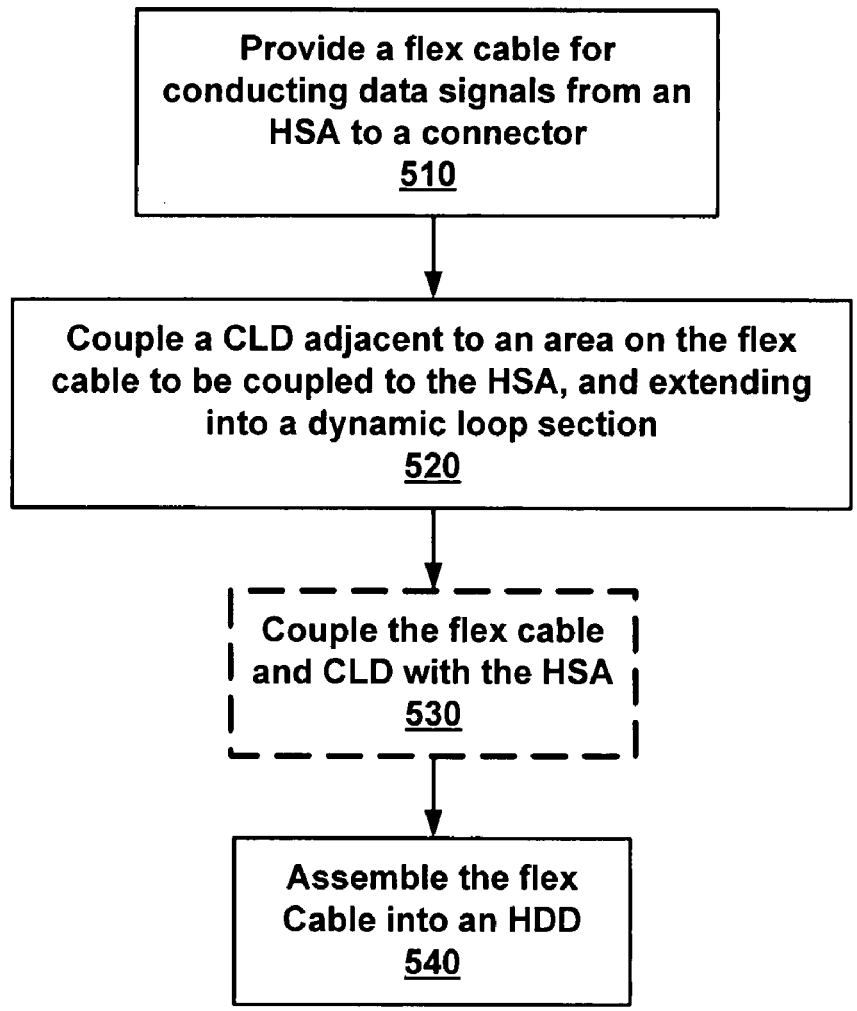
FIG. 5 is a flow chart illustrating a process for reducing random transient vibration in a hard disk drive in accordance with one embodiment of the present invention.

FIG. 5 is a flow chart illustrating a process 500 for reducing random transient vibration of an HSA in an HDD, in accordance with an embodiment of the present invention. In accordance with an embodiment of the present invention, process 500 can be performed at any level of assembly, e.g. flex cable 110, flex cable assembly (250, 350), comb assembly 200, HSA 120, and actuator 300. At which level of component or assembly that process 500 is performed depends upon the HDD designer and manufacturer and is not to limit the spirit of embodiments of the present invention.

In one embodiment, process 500 is carried out by processors and electrical components under the control of computer readable and computer executable instructions. The computer readable and computer executable instructions reside, for example, in data storage features such as computer usable volatile and non-volatile memory. However, the computer readable and computer executable instructions may reside in any type of computer readable medium. Although specific components are disclosed in process 500, such components are examples of components for carrying out process 500. That is, the embodiments of the present invention are well suited to performing various other components or variations of the components recited in FIG. 5. Within the present embodiment, it should be appreciated that the components of process 500 may be performed by software, by hardware, by an assembly mechanism, through human interaction, or by any combination of software, hardware, assembly mechanism, and human interaction.

Process 500 will be described with reference to elements shown in FIG. 1, FIG. 2, and FIG. 3.

In one embodiment, as shown at 510 of process 500, flex cable 110 for conducting data signals from HSA 120 to connector 116 is provided. Flex cable 110 may be an individual flex cable component or coupled with an assembly such as, flex cable assembly (250, 350), comb assembly 200, HSA 120, and actuator 300.

In one embodiment, as shown at 520 of process 500, CLD (255, 355) is coupled with flex cable 110 such that CLD (255, 355) is adjacent to an area of flex cable 110 operable to being coupled with HSA 120. CLD (255, 355) is coupled with flex cable 110 such that CLD (255, 355) extends into dynamic loop section 220. Upon assembly into HDD 100, dynamic loop section 220 will form a dynamic loop.

In accordance with an embodiment of the present invention, coupling CLD (255, 355) with flex cable 110 comprises adhesively attaching CLD (255, 355) with flex cable 110. Some viscoelastic damping materials such as 3M Corporation's ISD-110, ISD-120, and ISD-142; and Nitto Denko Corporation's LA-50/100 are pressure sensitive adhesives and can be adhesively attached to other materials. In accordance with an embodiment of the present invention, coupling CLD (255, 355) with flex cable 110 comprises pressing a surface of viscoelastic damping layer 251 of CLD (255, 355) onto flex cable 110.

In another embodiment, as shown at 530 of process 500, flex cable 110 is coupled with HSA 120. Coupling flex cable 110 comprising CLD (255, 355) with HSA 120 can be accomplished by a coupler device such as coupler 230, which is integral with comb 210. Coupling flex cable 110 comprising CLD (255, 355) with HSA 120 can be accomplished by a coupler device such as coupler 330, which is a component that is attachable with flex cable assembly 350 and/or comb 310.

In one embodiment, as shown at 540 of process 500, actuator 300 is assembled into HDD 100, whereby a dynamic loop is formed in dynamic loop section 220 of flex cable 110. The dynamic loop contains a portion of CLD (255, 355). In one embodiment, the dynamic loop is directed toward termination 222 of HSA 120. In another embodiment the dynamic loop is formed toward VCM 142.

Having coupled CLD (255, 355) adjacent to an area of flex cable 110, which is coupled with HSA 120, and coupled CLD (255, 355) such that CLD (255, 355) extends into dynamic loop section 220, upon assembly of HSA 120 into HDD 100, CLD (255, 355) will undergo strain with motion of the dynamic loop during operation of actuator 300. The strain energy imparted into CLD (255, 355) is dissipated as a small amount of heat and thereby dampens the vibration of flex cable 110.

The present invention, in the various presented embodiments improves the performance of an HDD. Embodiments of the present invention provide vibration damping of an actuator that enables a magnetic transducer to settle on a prewritten data track faster and retrieve a customer's data more quickly. By damping vibrations in the flex cable and hence the actuator, the HDD controller will not need to wait until the actuator has stopped vibrating before writing a data track. A better damped actuator allows the HDD designer to design an HDD with higher track density, since the actuator can settle more accurately on more closely spaced data tracks.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A flex cable assembly for a head stack assembly of a hard disk drive, said flex cable assembly comprising:
    a flex cable for conducting data signals from said head stack assembly to a connector, said flex cable having a dynamic loop section between a termination for said head stack assembly and said connector; and
    a constrained layer damper attached to said dynamic loop section of said flex cable and attached adjacently to an area of said flex cable configured for receiving a coupler, by which said flex cable assembly is coupled with said head stack assembly and wherein said constrained layer damper has a surface in which said entire surface is in direct contact with said flex cable and said entire surface is coupled with a concave surface of said dynamic loop section of said flex cable.

2. The flex cable assembly of claim 1 wherein said constrained layer damper comprises:
    at least one constraining layer coupled with a first surface of a viscoelastic damping layer; and said flex cable coupled to a second surface of said viscoelastic damping layer, wherein said first surface is parallel to said second surface.

3. The flex cable assembly of claim 2 wherein said constraining layer is selected from the group of constraining layer materials consisting of: polyimide, UPILEX, KAPTON, polyester, and MYLAR.

4. The flex cable assembly of claim 2 wherein said viscoelastic damping layer comprises a pressure sensitive adhesive.

5. The flex cable assembly of claim 2 wherein said viscoelastic damping layer is selected from the group of viscoelastic damping materials consisting of: acrylic adhesive, LA-50/100, ISD-110, ISD-120, and ISD-142.

6. The flex cable assembly of claim 1 wherein said constrained layer damper has a T-shape.

7. The flex cable assembly of claim 1 further comprises said coupler for attaching said flex cable assembly to said head stack assembly.

8. The flex cable assembly of claim 7 wherein said coupler for attaching said flex cable assembly to said head stack assembly comprises a curved device, which directs said dynamic loop section toward said termination of said head stack assembly.

9. A hard disk drive comprising:
    a base casting for providing attachment points for the major components of said disk drive assembly;
    a motor-hub assembly to which at least one disk is coupled allowing rotation of said disk, wherein said motor-hub assembly is attached to said base casting, wherein said disk has at least one surface of data tracks; and
    an actuator comprising:
        a comb to which at least one suspension is coupled, wherewith a slider including a magnetic recording transducer for reading and writing said data tracks onto said surface is coupled with said comb;

a pivot bearing coupled with said base casting and coupled with a head stack assembly allowing said head stack assembly to move said magnetic recording transducer arcuately across said data tracks; and a flex cable assembly comprising:

a flex cable for conducting data signals from said head stack assembly to a connector, said flex cable having a dynamic loop section between a termination of said head stack assembly and said connector; and a constrained layer damper attached to said dynamic loop section of said flex cable and attached adjacently to an area of said flex cable configured for receiving a coupler, by which said flex cable assembly is coupled with said head stack assembly and wherein said constrained layer damper has a surface in which said entire surface is in direct contact with said flex cable and said entire surface is coupled with a concave surface of said dynamic loop section of said flex cable.

10. The hard disk drive of claim 9 wherein said constrained layer damper comprises:

a constraining layer coupled to a first surface of a viscoelastic damping layer, and said flex cable coupled to a second surface of said viscoelastic damping layer, wherein said first surface is parallel to said second surface.

11. The hard disk drive of claim 10 wherein said constraining layer is selected from the group of constraining layer materials consisting of: polyimide, UPILEX, KAPTON, polyester, and MYLAR.

12. The hard disk drive of claim 10 wherein said viscoelastic damping layer comprises a pressure sensitive adhesive.

13. The hard disk drive of claim 10 wherein said viscoelastic damping layer is selected from the group of viscoelastic damping materials consisting of: acrylic adhesive, LA-50/100, ISD-110, ISD-120, and ISD-142.

14. The hard disk drive of claim 9 wherein said constrained layer damper has a T-shape.

15. The hard disk drive of claim 9 wherein said flex cable assembly further comprises said coupler for attaching said flex cable assembly to said head stack assembly.

16. The hard disk drive of claim 9 wherein said coupler for attaching said flex cable assembly to said head stack assembly comprises a curved device, which directs said dynamic loop section toward said termination of said head stack assembly.

17. The hard disk drive of claim 9 wherein said coupler for attaching said flex cable assembly to said head stack assembly is comprised integrally within a comb.

18. A method of reducing random transient vibration in a hard disk drive comprising:

providing a flex cable for conducting data signals from a head stack assembly to a connector;

coupling a constrained layer damper to said flex cable, whereby said constrained layer damper is adjacent to an area of said flex cable which is operable to being coupled with said head stack assembly and, whereby said constrained layer damper extends into a dynamic loop section which is operable to forming a dynamic loop and wherein said constrained layer damper has a surface in which said entire surface is in direct contact with said flex cable and said entire surface is only coupled with a concave surface of said dynamic loop section of said flex cable; and assembling said flex cable into said hard disk drive, whereby said dynamic loop is formed in said flex cable and said dynamic loop contains a portion of said constrained layer damper.

19. The method of claim 18 further comprising:

coupling said flex cable and said constrained layer damper with said head stack assembly.

20. The method of claim 18 wherein said coupling said constrained layer damper comprises:

adhesively attaching said constrained layer damper to said flex cable.

21. The method of claim 18 wherein said coupling said constrained layer damper comprises:

pressing a surface of a viscoelastic damping layer of said constrained layer damper onto said flex cable.

22. The method of claim 18 wherein said assembling said head stack assembly into said hard disk drive comprises:

forming a dynamic loop directed toward a termination of said head stack assembly.

* * * * *